United States Patent
Cao et al.

(10) Patent No.: US 11,104,589 B2
(45) Date of Patent: *Aug. 31, 2021

(54) RECYCLING METHOD OF AMPHIPHILIC SURFACE-ACTIVE POLLUTANTS IN WATER

(71) Applicant: INSTITUTE OF PROCESS ENGINEERING, CHINESE ACADEMY OF SCIENCES, Haidian District (CN)

(72) Inventors: Hongbin Cao, Haidian District (CN); He Zhao, Haidian District (CN); Qin Dai, Haidian District (CN); Shanshan Sun, Haidian District (CN)

(73) Assignee: INSTITUTE OF PROCESS ENGINEERING, CHINESE ACADEMY OF SCIENCES, Beijing (CN)

(*) Notice: Subject to any disclaimer, the term of this patent is extended or adjusted under 35 U.S.C. 154(b) by 90 days.

This patent is subject to a terminal disclaimer.

(21) Appl. No.: 16/521,118

(22) Filed: Jul. 24, 2019

(65) Prior Publication Data
US 2020/0148550 A1    May 14, 2020

(30) Foreign Application Priority Data

Nov. 9, 2018   (CN) .......................... 201811329869.5

(51) Int. Cl.
  *C02F 1/30*   (2006.01)
  *C02F 1/66*   (2006.01)
  (Continued)

(52) U.S. Cl.
  CPC .................. *C02F 1/30* (2013.01); *C02F 1/66* (2013.01); *C02F 2001/007* (2013.01); *C02F 2101/301* (2013.01)

(58) Field of Classification Search
None
See application file for complete search history.

(56) References Cited

U.S. PATENT DOCUMENTS

2019/0300786 A1* 10/2019 Cao .......................... C01B 32/15

FOREIGN PATENT DOCUMENTS

CN         108558638 A      9/2018

OTHER PUBLICATIONS

Elkacmi et al, Extraction of Oleic Acid from Moroccan Olive oil Mill Wastewater, BioMed Research International (Year: 2016).*

* cited by examiner

*Primary Examiner* — Matthew O Savage
(74) *Attorney, Agent, or Firm* — Woodard, Emhardt, Henry, Reeves & Wagner, LLP

(57) ABSTRACT

The present disclosure provides a recycling method of amphiphilic surface-active pollutants in water, comprising: performing a polymerization reaction by illumination treatment on the amphiphilic surface-active pollutants in water to form a polymerization product; performing self-assembly on the polymerization product for aggregation to form a fluorescent material, and performing separation to obtain a recycled product. Through treatment of the amphiphilic surface-active pollutants by illumination, the present disclosure can realize the recycled utilization of the amphiphilic pollutants in the wastewater by one step of reaction, so that the amphiphilic surface-active pollutants can be converted into usable fluorescent materials, and the biological toxicity is greatly reduced. The obtained fluorescent material can be further used in the fields such as biological imaging as a recycled product, realizes detoxification of the pollutants and efficient conversion of organic carbon resources at the same time, provides a novel strategy for wastewater treatment and resource conversion, and achieves a win-win (Continued)

situation for economic benefits and environmental friendliness in the field of amphipathic organic pollution treatment and has a good application prospect.

19 Claims, 3 Drawing Sheets

(51) Int. Cl.
*C02F 101/30* (2006.01)
*C02F 1/00* (2006.01)

RECYCLING METHOD OF AMPHIPHILIC SURFACE-ACTIVE POLLUTANTS IN WATER

CROSS-REFERENCE TO RELATED APPLICATIONS

This application claims priority to Chinese Patent Application No. 201811329869.5, filed on Nov. 9, 2018, the contents of which are incorporated herein in its entirety by reference.

TECHNICAL FIELD

The present disclosure belongs to the technical field of pollutant recycling, and relates to a recycling method of amphiphilic surface-active pollutants in water.

BACKGROUND

Amphiphilic organic pollutants represented by surfactants, which are increasingly used in the fields such as life and industry, enter sewage and wastewater after production or use, greatly reducing the treatment efficiency of sewage and wastewater. Surfactants are prone to surface enrichment due to their amphiphilic properties. At present, the recycling of amphiphilic surface-active pollutants in water generally adopts a method of directly collecting scum on liquid surface by using a machine, which has defects of time-consuming and labor-intensive, complicated processes, energy waste and higher costs.

CN102464381A discloses a method for collecting oil slick on water surface, wherein the method comprises: providing a water-oil separation device comprising an oil collection chamber (2) surrounded by a wall (1), at least a part of the surface of the wall (1) is covered by a porous oleophilic hydrophobic layer (3), the portion of the wall (1) covered by the porous oleophilic hydrophobic layer (3) allows water and oil to pass through, and the device further comprises a fixed layer (4) overlying or superposed on the surface of the porous oleophilic hydrophobic layer (3) for defining the flow of the porous oleophilic hydrophobic layer, and the fixed layer (4) allows water and oil to pass through, the porous oleophilic hydrophobic layer (3) has a pore diameter of 300-850 μm and a porosity of 10-40%; placing the oil-water separation device on the surface of the water having oil slick, making at least a part of the surface of the fixed layer (4) overlying or superposed on the surface of the porous oleophilic hydrophobic layer (3) for defining the flow of the porous oleophilic hydrophobic layer contact with the surface of the water having oil slick; and collecting oil slick in the oil collection chamber. Large-area offshore oil slick can be efficiently collected by the method of this invention. However, this method is costly and fails to re-use the collected product.

CN107902828A discloses a method for recovering high-concentration nonionic surfactant in wastewater, comprising the following steps: (1) adding an organic solvent to a wastewater having a concentration of nonionic surfactant of 1-15%, stirring uniformly, and then standing for stratification; (2) pumping the aqueous phase after the stratification into a flash evaporator, flashing to remove the organic solvent, discharging the flashed wastewater into a biochemical tank to remove the organics, and stratifying the mixture of the organic solvent and the water obtained after flashing for reuse; or filtering the aqueous phase by a flat ceramic membrane, discharging the filtered clean water directly, and recovering the filtered organic solvent; and (3) pumping the organic phase after the stratification into a distiller for distillation and condensation to recover the organic solvent, with the remainder being the recycled nonionic surfactant. In this method, the surfactant is recovered mainly by physical methods. However, the recovery efficiency is not high, the method is complicated, and the application range is limited.

As a green and clean energy source, light has gradually received attention in the field of recycling. In fact, photoinitiated polymerization-induced self-assembly is a research hotspot in the field of polymer materials. The study found that mild conditions of water environment also led to the photoinduced polymerization-self-assembly process of amphiphilic surface-active pollutants, providing a resource conversion basis for organic pollutants in wastewater (Science, 2016, 353 (6300): 699-702; Journal of the American Chemical Society, 2014, 136 (45): 16096-16101). However, to date, there has been no report on the use of photopolymerization-self-assembly methods for recycling treatment of amphiphilic organic pollutants in water at home and abroad. There exists a need to develop a novel recycling method having a positive effect on recycling and environmental protection.

SUMMARY

The present disclosure aims to provide a recycling method of amphiphilic surface-active pollutants in water, to solve the problem of insufficient utilization of secondary resources in the existing industrial wastewater treatment technologies, and resulting problems of toxicity, environmental protection and economy.

To achieve the purpose, the present disclosure adopts the following technical solutions:

The present disclosure provides a recycling method of amphiphilic surface-active pollutants in water, comprising: performing conversion polymerization by illumination treatment on the amphiphilic surface-active pollutants in water to form a polymerization product; performing self-assembly on the polymerization product for aggregation to form a fluorescent material, and performing separation to obtain a recycled product.

Through treatment of the amphiphilic surface-active pollutants by illumination, the present disclosure can realize the recycled utilization of the amphiphilic pollutants in the wastewater by one step of reaction, so that the amphiphilic surface-active pollutants can be converted into usable fluorescent materials, and the biological toxicity is greatly reduced. The obtained fluorescent material can be further used in the fields such as biological imaging as a recycled product, realizes detoxification of the pollutants and efficient conversion of organic carbon resources at the same time, and provides a novel strategy for wastewater treatment and resource conversion.

At present, among the existing methods, no research has been reported on a method for treating amphiphilic surface-active pollutants in water by using polymerization and self-assembly processes.

The polymerization product formed by the above conversion polymerization is generally an oligomerized product such as a dimer; and the fluorescent material obtained by self-assembly is an ordered fluorescent material.

Illustratively, in the case of wastewater having nonanoic acid as a pollutant, the light-induced nonanoic acid forms a dimer thereof and some unsaturated ketone, unsaturated aldehyde or unsaturated acid, and the dimer further forms vesicles as a microreactor and wraps these unsaturated ketone, unsaturated aldehyde or unsaturated acid, which is further converted into a fluorescent carbon nanoparticle-based fluorescent material by a nanoreactor under illumination.

Preferably, the wavelength for the illumination is 100 nm-1200 nm, and may be, for example, 100 nm, 200 nm, 300 nm, 400 nm, 500 nm, 600 nm, 700 nm, 800 nm, 900 nm, 1000 nm, 1100 nm, 1200 nm and the like, preferably 200 nm-900 nm.

In the present disclosure, the wavelength for the illumination influences the conversion rate of the amphiphilic surface-active pollutants. In case the wavelength for the illumination is excessively high, the amphiphilic surface-active pollutants can hardly be converted; and in case the wavelength for the illumination is excessively low, the excessively high energy resulted from the illumination will lead to reduced control effect on amphiphilic surface-active pollutants as well as reduced conversion rate.

Preferably, the amphiphilic surface-active pollutants comprise any one selected from the group consisting of an anionic surfactant, a cationic surfactant, a nonionic surfactant, and a combination of at least two select therefrom.

In the present disclosure, general surfactant pollutants having amphiphilicity can be subjected to this method for recycling treatment. In the water, the volume ratio of the amphiphilic surface-active pollutants to the water is 0.0001%-99.9%, and may be, for example, 0.0001%, 0.005%, 0.06%, 0.1%, 1%, 10%, 15%, 30%, 35%, 73%, 85%, 90%, 99.9% and the like. It can be seen that the pollutants that can be treated have an extremely wide range of concentrations. Amphiphilic surface-active pollutants with almost any concentration can be treated by illumination, and are not limited to a specific concentration or a specific concentration range, which allows extremely convenient treatment. Moreover, there is no need to add any other organic solvents or auxiliaries, which saves economic costs and is environmentally friendly, achieving a win-win situation for economic benefits and environmental protection.

Preferably, the anionic surfactant comprises any one selected from the group consisting of sodium dodecyl benzene sulfonate, sodium alcohol ether sulfate, ammonium alcohol ether sulfate, primary alcohol ethoxylate, sodium lauryl sulfate, olefin sulfonate, perfluorooctane sulfonate, and a combination of at least two selected therefrom. The typical but non-limiting combinations include: a combination of sodium dodecyl benzene sulfonate and sodium alcohol ether sulfate; a combination of ammonium alcohol ether sulfate, primary alcohol ethoxylate and sodium lauryl sulfate; a combination of perfluorooctane sulfonate, primary alcohol ethoxylate, sodium lauryl sulfate and olefin sulfonate.

In the present disclosure, the olefin sulfonate may be, for example, sodium α-olefin sulfonate; the perfluorooctane sulfonate may be, for example, sodium perfluorooctane sulphonate.

Preferably, the cationic surfactant comprises an alkyl imidazoline surfactant and/or a quaternary ammonium surfactant.

In the present disclosure, any typical alkyl imidazoline surfactant in the art can be used as the cationic surfactant; the quaternary ammonium surfactant may be an alkyl trimethyl ammonium salt, a dialkyl dimethyl ammonium salt, an alkyldimethyl benzyl ammonium salt and the like.

Preferably, the nonionic surfactant comprises any one selected from the group consisting of alkylphenol ethoxylates, $C_1$-$C_{30}$ (e.g. $C_1$, $C_4$, $C_8$, $C_9$, $C_{10}$, $C_{11}$, $C_{12}$, $C_{16}$, $C_{20}$, $C_{25}$ or $C_{30}$) saturated fatty acid, fatty alcohol, fatty aldehyde and fatty amine, $C_1$-$C_{30}$ (e.g. $C_1$, $C_4$, $C_8$, $C_9$, $C_{10}$, $C_{11}$, $C_{12}$, $C_{16}$, $C_{20}$, $C_{25}$ or $C_{30}$) unsaturated fatty acid, fatty alcohol, fatty aldehyde and fatty amine, phthalate (e.g. dibutyl phthalate, diisooctyl phthalate), and a combination of at least two selected therefrom.

In the present disclosure, the $C_1$-$C_{30}$ saturated fatty acid/alcohol/aldehyde/amine may be, for example, hexanoic acid/alcohol/aldehyde/amine, heptanoic acid/alcohol/aldehyde/amine, caprylic acid/alcohol/aldehyde/amine, nonanoic acid/alcohol/aldehyde/amine, decanoic acid/alcohol/aldehyde/amine and the like; the $C_1$-$C_{30}$ unsaturated fatty acid/alcohol/aldehyde/amine may be, for example, 2-alkenyl n-hexanoic acid/alcohol/aldehyde/amine, 3-alkenyl n-heptanoic acid/alcohol/aldehyde/amine and the like.

It can be seen from the above-mentioned types of amphiphilic surface-active pollutants that the treatment method provided by the present disclosure is suitable for treatment of wastewater containing surfactants, and has wide application range and high application value.

Preferably, the illumination time is 0.5 h-48 h, and may be, for example, 0.5 h, 1 h, 5 h, 10 h, 20 h, 23 h, 30 h, 34 h, 35 h, 38 h, 40 h, 42 h, 45 h or 48 h, preferably 4 h-12 h.

Preferably, the polymerization reaction further comprises: adding a photosensitizer to the water.

In the present disclosure, the fluorescence of the treated recycled product can be enhanced by the addition of the photosensitizer. In general, typical photosensitizers can be added to wastewater, and it may be, for example, azobisisobutyronitrile, lactochrome, benzoin dimethyl ether, benzophenone and the like.

Preferably, the polymerization reaction is carried out under stirring.

Preferably, the stirring rate is 10 r/min-300 r/min, and may be, for example, 10 r/min, 20 r/min, 30 r/min, 50 r/min, 80 r/min, 100 r/min, 150 r/min, 200 r/min, 250 r/min, 300 r/min and the like.

Preferably, the pressure of self-assembly is any one selected from the group consisting of normal pressure, low pressure and high pressure.

Preferably, the low pressure has a pressure range of 0--0.1 MPa, and may be, for example, 0 MPa, -0.05 MPa, -0.09 MPa, -0.1 MPa and the like.

Preferably, the high pressure has a pressure range of 2-50 MPa, and may be, for example, 2 MPa, 3 MPa, 10 MPa, 15 MPa, 20 MPa, 30 MPa, 35 MPa, 40 MPa, 45 MPa, 50 MPa and the like.

Preferably, the temperature of self-assembly is 10-200° C., and may be, for example, 10° C., 20° C., 30° C., 40° C., 50° C., 80° C., 120° C., 160° C., 200° C. and the like.

Preferably, the self-assembly is conducted under any atmosphere selected from the group consisting of nitrogen gas, oxygen gas, argon gas, ozone gas, helium gas, neon gas and air.

Preferably, the self-assembly is conducted under normal pressure, a temperature of 10° C.-50° C. and air atmosphere.

Preferably, the means of the separation comprises any one selected from the group consisting of extraction, chromatography, gel chromatography, physical standing, and a combination of at least two selected therefrom.

Preferably, the means of the separation is physical standing.

Preferably, the time of physical standing is 2-10 days, and may be, for example, 2 days, 3 days, 4 days, 5 days, 6 days, 7 days, 8 days, 9 days, 10 days and the like.

Preferably, the recycled product is used in the preparation of catalysts, electrochemical analysis materials or bio-imaging materials.

In the present disclosure, the treated recycled product can be further applied to various fields without secondary pollution. For example, the recycled product can be used as a bio-imaging material in the medical imaging field; it can also be used as a catalyst in a bioreactive catalytic process; or as a fluorescent marker in electrochemical analysis for analysis.

As a preferred technical solution of the present disclosure, the processing method provided by the present disclosure comprises: by illumination treatment with a wavelength of 100 nm-200 nm for 0.5 h-48 h, performing a polymerization reaction on the amphiphilic surface-active pollutants in water under stirring at a rate of 10 r/min-300 r/min to form a polymerization product; performing self-assembly on the polymerization product under normal pressure, a temperature of 10° C.-50° C. and air atmosphere for aggregation to form a fluorescent material, and performing separation to obtain a recycled product.

As compared to the existing technologies, the present disclosure has the following beneficial effects:

Through treatment of the amphiphilic surface-active pollutants by illumination, the present disclosure can realize the recycled utilization of the amphiphilic pollutants in the wastewater by one step of reaction, so that the amphiphilic surface-active pollutants can be converted into usable fluorescent materials through photoinduced polymerization and self-assembly reactions, and the biological toxicity of the wastewater is greatly reduced. The obtained fluorescent material can be further used in the fields such as biological imaging, realizes detoxification of the pollutants and efficient conversion of organic carbon resources at the same time, and provides a novel strategy for wastewater treatment and resource conversion.

The recycling treatment method provided by the present disclosure has safe and simple process, low preparation cost and no secondary pollution. The recycled product prepared therefrom has high electrochemical and luminescent properties after purification, and has broad application prospects in the fields such as environment, catalysis, electrochemistry and biological imaging, achieving a win-win situation for economic benefits and environmental friendliness in the field of organic wastewater treatment.

DETAILED DESCRIPTION

Figure 1:
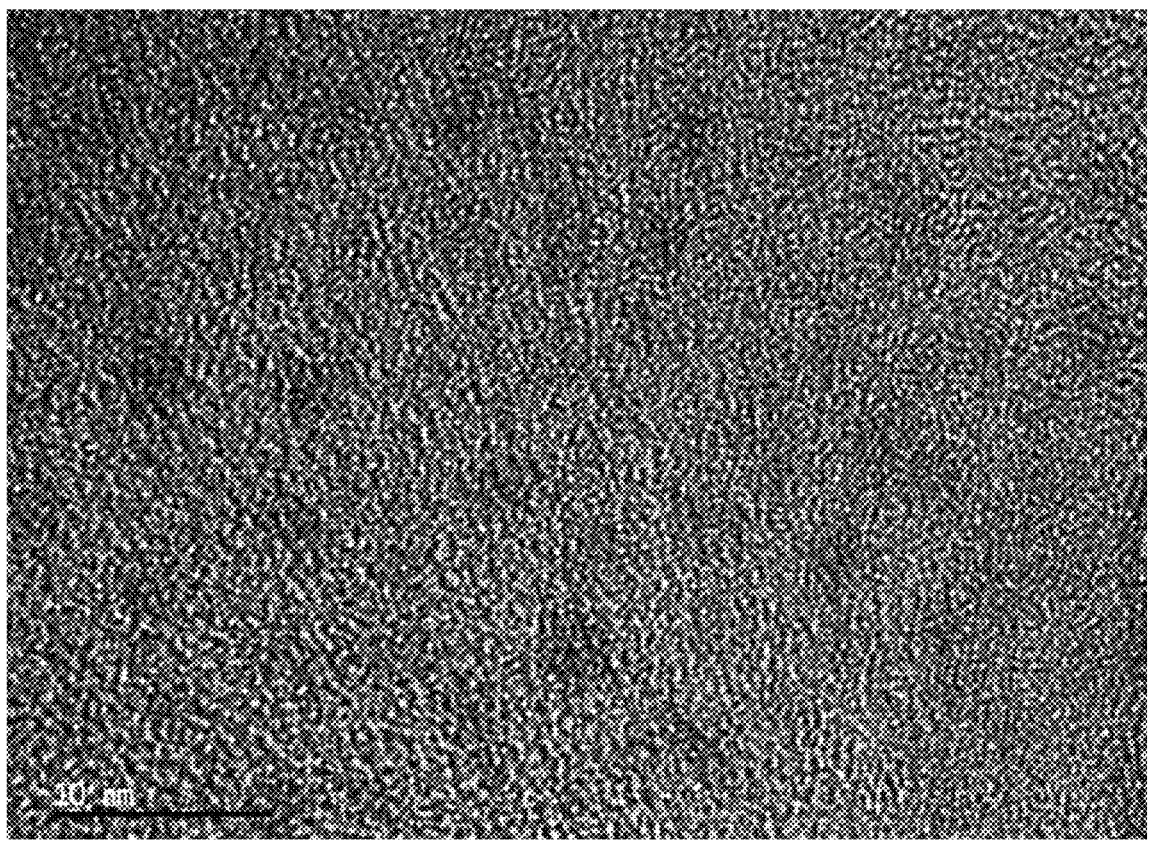
FIG. 1 is an electron micrograph of the recycled product obtained in Example 1 of the present disclosure (with a scale of 10 nm).

The technical solution of the present disclosure is further illustrated by the specific embodiments below. Those skilled in the art shall understand that the examples are set forth to assist in understanding the present disclosure and should not be regarded as specific limitations to the present disclosure.

Example 1

In this example, a wastewater containing nonanoic acid as a pollutant was treated by the following steps:

a mixture of nonanoic acid (NA) and water in a volume ratio of 1% was sonicated for 10 min, magnetically stirred for 10 min at 200 r/min, and irradiated for 16 h at 770 nm, self-assembled and aggregated at 25° C. at normal pressure under air atmosphere, followed by physical standing for 8 days, and a recycled product was obtained. According to mass spectrometry, the recycled conversion rate of nonanoic acid in the wastewater reached 73.8%.

Example 2

In this example, a wastewater containing dibutyl phthalate as a pollutant was treated by the following steps:

a mixture of dibutyl phthalate and water in a volume ratio of 2% was sonicated for 10 min, magnetically stirred for 10 min at 300 r/min, and irradiated for 0.5 h at 1200 nm, self-assembled and aggregated at 25° C. at normal pressure under air atmosphere, followed by physical standing for 2 days, and a recycled product was obtained. According to mass spectrometry, the recycled conversion rate of dibutyl phthalate in the wastewater reached 62.4%.

Example 3

In this example, a wastewater containing primary alcohol ethoxylate and sodium lauryl sulfate as pollutants was treated by the following steps:

a mixture of primary alcohol ethoxylate, sodium lauryl sulfate, and water in a ratio of the volume of primary alcohol ethoxylate and sodium lauryl sulfate to the volume of the water of 1% was sonicated for 10 min, magnetically stirred for 10 min at 10 r/min, and irradiated for 48 h at 100 nm, self-assembled and aggregated at 25° C. at normal pressure under air atmosphere, followed by separation and purification with a silica gel plate, and a recycled product was obtained.

According to mass spectrometry, the recycled conversion rate of primary alcohol ethoxylate and sodium lauryl sulfate in the wastewater reached 59.3%.

Example 4

In this example, a wastewater containing α-olefin sulfonate and sodium alcohol ether sulfate as pollutants was treated by the following steps:

a mixture of α-olefin sulfonate, sodium alcohol ether sulfate and water in a ratio of the volume of α-olefin sulfonate and sodium alcohol ether sulfate to the volume of the water of 1% was sonicated for 10 min, magnetically stirred for 10 min at 200 r/min, and irradiated for 10 h at 700 nm, self-assembled and aggregated at 25° C. at normal pressure under air atmosphere, followed by separation and purification with a silica gel plate, and a recycled product was obtained. According to mass spectrometry, the recycled conversion rate of α-olefin sulfonate and sodium alcohol ether sulfate reached 61.7%.

Example 5

In this example, a wastewater containing octanoic acid and sodium alcohol ether sulfate as pollutants was treated by the following steps:

benzophenone as a photosensitizer was added to a mixture of octanoic acid, sodium alcohol ether sulfate and water in a ratio of the volume of octanoic acid and sodium alcohol ether sulfate to the volume of the water of 86.8%. The mixture was sonicated for 10 min, magnetically stirred for 10 min at 200 r/min, and irradiated for 10 h at 700 nm, self-assembled and aggregated at 40° C. at normal pressure under air atmosphere, followed by separation and purification with a silica gel plate to obtain fluorescent carbon nanoparticles as a recycled product. According to mass spectrometry, the recycled conversion rate of octanoic acid and sodium alcohol ether sulfate reached 45.8%.

Example 6

In this example, a wastewater containing 2-alkenyl n-hexanoic acid as a pollutant was treated by the following steps:

a mixture of 2-alkenyl n-hexanoic acid and water in a volume ratio of 0.005% was irradiated for 14 h at 800 nm, then self-assembled and aggregated at 25° C. at normal pressure under air atmosphere, followed by separation and purification with a silica gel plate to obtain fluorescent carbon nanoparticles as a recycled product. According to mass spectrometry, the recycled conversion rate of 2-alkenyl n-hexanoic acid in the wastewater reached 57.6%.

Comparison Example 1

The only difference from Example 1 is that, in the present comparison example, no treatment of wastewater by illumination at 700 nm was conducted.

This comparison example failed to process wastewater to obtain recycled products, and failed to realize recycled utilization.

Figure 2A:
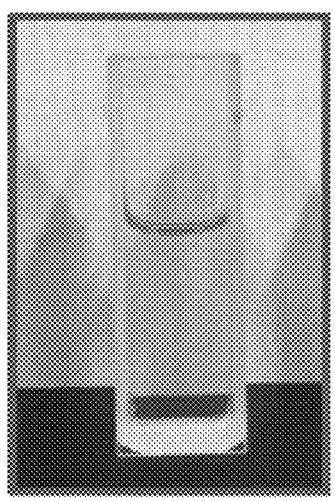
FIG. 2A is a view showing the recycled product obtained in Example 1 of the present disclosure observed under indoor sunlight.
Figure 2B:
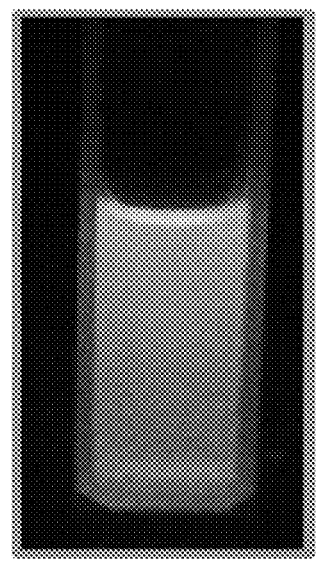
FIG. 2B is a view showing the recycled product obtained in Example 1 of the disclosure observed under an ultraviolet lamp.

Performance Tests of Recycled Products:

The recycled product obtained in Example 1 was observed under electron microscope, indoor sunlight, and ultraviolet light, specifically as shown in FIG. 1, FIG. 2A and FIG. 2B. As can be seen from FIG. 1, it is found through electron microscopy that the fluorescent carbon nanoparticles have a spheroidal external form and a particle diameter of less than 10 nm. FIG. 2A illustrates that the fluorescent carbon nanomaterial is dispersed in the solvent and shows yellow under indoor sunlight, and FIG. 2B illustrates that it shows bright blue fluorescence under ultraviolet light irradiation.

Figure 3:
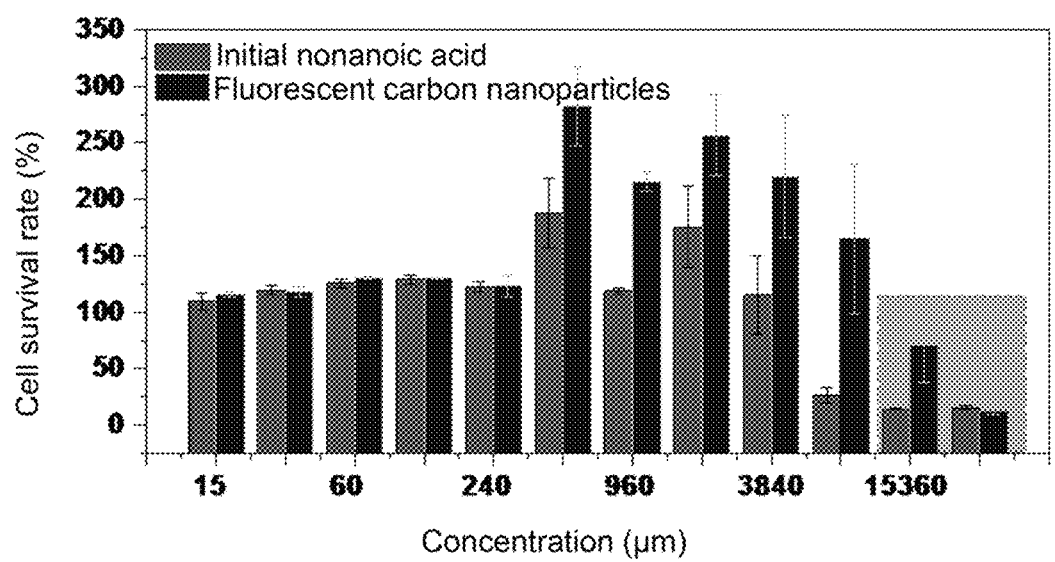
FIG. 3 is a bar graph of the cytotoxicity test of the recycled product obtained in Example 1 of the present disclosure.
Figure 4:
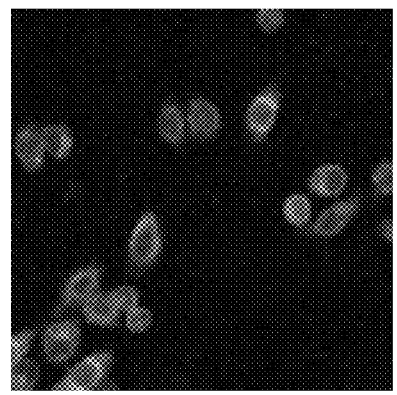
FIG. 4 is a view showing a use of the recycled product obtained in Example 1 of the present disclosure in cell imaging.

The recycled product prepared in Example 1 was subjected to cytotoxicity test (with results shown in FIG. 3) and cell imaging test (with a result shown in FIG. 4):

The cytotoxicities of the obtained recycled product in the remaining NA solution and the original NA were evaluated by MTT (3-(4,5-dimethyl thiazol-2-yl)-2,5-diphenyltetrazolium bromide) assay. Human lung cancer cell line A549 cells were grown in DMEM medium supplemented with 10% (v/v) of fetal bovine serum (FBS) and 1% of penicillin streptomycin. A549 was first incubated at 37° C. for 24 hours with a density of 5000 cells per well. After being washed with phosphate buffered saline (PBS, pH=7.4), A549 cells were incubated together with 200 µL of medium having various concentrations for 24 hours (15 µM, 30 µM, 60 µM, 120 µM, 240 µM, 480 µM, 960 µM, 1920 µM, 3840 µM, 7680 µM, 15360 µM). Three sets of parallel replicates were prepared for each concentration. Then, the medium was removed and replaced with 20 µL of MTT solution (5 mg/mL). A549 cells were further incubated for 3 hours. The medium having MTT was removed and replaced with 100 µL of DMSO. The plate was then shaken for 10 minutes. To assess cell viability, the optical density of the mixture at 492 nm was measured by an enzyme-linked immunosorbent assay spectrophotometer (infinite F90). For labeling, A549 cells were incubated at 37° C. for 24 hours in a cell culture dish with glass bottom at a density of 5000 cells/well and then mixed with prepared FCNs samples. After incubating for 3 hours at a concentration of 480 µM, A549 cells were thoroughly washed three times with PBS (pH=7.4), and then fixed with 1 mL of paraformaldehyde (1%, v/v). The control group was carried out in the absence of FCN. The cell culture dish with glass bottom was covered with a tin foil until cell images were obtained by fluorescence microscopy under excitation at 408 nm, 488 nm and 561 nm.

According to the toxicity test, at low concentration (15-240 µM), nonanoic acid and the recycled product have almost no effect on cell viability; when the concentration is 480-3840 µM, the recycled product can promote cell growth more than nonanoic acid; when the concentration is greater than 3840 µM, nonanoic acid shows significant toxicity to the cells, while the recycled product is still not significantly toxic to the cells. In summary, the conversion of nonanoic acid to a recycled product reduces the cytotoxicity to the organism. The above toxicity tests demonstrate that the treatment method provided by the present disclosure can greatly reduce the toxicity of amphiphilic surface-active pollutants in wastewater.

It can be seen from the cell imaging test that the recycled product obtained by the recycling treatment of the present disclosure can be well applied to cell imaging and can be fully applicable to the bio-imaging field.

The applicant declares that the recycling method of amphiphilic surface-active pollutants in water is illustrated by the above examples. However, the present disclosure is not limited to the above process steps, that is, it does not mean that the present disclosure must rely on the above process steps to be implemented. It will be apparent to those skilled in the art that any modifications of the present disclosure, equivalent substitutions of the materials for the product of the present disclosure, and additions of auxiliary ingredients, selections of the specific means and the like, are all within the protection and disclosure scopes of the present disclosure.

What is claimed is:

1. A recycling method of amphiphilic surface-active pollutants in water, comprising: performing a polymerization reaction by illumination treatment on the amphiphilic surface-active pollutants in water to form a polymerization product; performing self-assembly on the polymerization product for aggregation to form a fluorescent material, and performing separation to obtain a recycled product.

2. The recycling method according to claim 1, wherein the wavelength for the illumination is 100 nm-1200 nm.

3. The recycling method according to claim 1, wherein the amphiphilic surface-active pollutants are selected from the group consisting of an anionic surfactant, a cationic surfactant, a nonionic surfactant, and a combination of at least two select therefrom.

4. The recycling method according to claim 1, wherein in the water, the volume ratio of the amphiphilic surface-active pollutants to the water is 0.0001%-99.9%.

5. The recycling method according to claim 3, wherein anionic surfactant is selected from the group consisting of sodium dodecyl benzene sulfonate, sodium alcohol ether sulfate, ammonium alcohol ether sulfate, primary alcohol ethoxylate, sodium lauryl sulfate, olefin sulfonate, perfluorooctane sulfonate, and a combination of at least two selected therefrom.

6. The recycling method according to claim 3, wherein the cationic surfactant comprises an alkyl imidazoline surfactant and/or a quaternary ammonium surfactant.

7. The recycling method according to claim 3, wherein the nonionic surfactant is selected from the group consisting of alkylphenol ethoxylates, $C_1$-$C_{30}$ saturated fatty acid, fatty alcohol, fatty aldehyde and fatty amine, $C_1$-$C_{30}$ unsaturated fatty acid, fatty alcohol, fatty aldehyde and fatty amine, phthalate, and a combination of at least two selected therefrom.

8. The recycling method according to claim 1, wherein the illumination time is 0.5 h-48 h.

9. The recycling method according to claim 1, wherein the polymerization reaction further comprises: adding a photosensitizer to the water.

10. The recycling method according to claim 1, wherein the polymerization reaction is carried out under stirring.

11. The recycling method according to claim 10, wherein the stirring rate is 10 r/min-300 r/min.

12. The recycling method according to claim 1, wherein the pressure of self-assembly is selected from the group consisting of normal pressure, low pressure and high pressure.

13. The recycling method according to claim 12, wherein the low pressure has a pressure range of 0--0.1 MPa.

14. The recycling method according to claim 12, wherein the high pressure has a pressure range of 2-50 MPa.

15. The recycling method according to claim 1, wherein the temperature of self-assembly is 10-200° C.

16. The recycling method according to claim 1, wherein the self-assembly is conducted under an atmosphere selected from the group consisting of nitrogen gas, oxygen gas, argon gas, ozone gas, helium gas, neon gas and air.

17. The recycling method according to claim 1, wherein the self-assembly is conducted under normal pressure, a temperature of 10° C.-50° C. and air atmosphere.

18. The recycling method according to claim 1, wherein the means of the separation is selected from the group consisting of extraction, chromatography, gel chromatography, physical standing, and a combination of at least two selected therefrom.

19. The recycling method according to claim 1, wherein the means of the separation is physical standing; the time of physical standing is 2-10 days.

* * * * *